(12) United States Patent
Hwangbo et al.

(10) Patent No.: US 11,618,407 B2
(45) Date of Patent: Apr. 4, 2023

(54) SIDE AIRBAG FOR VEHICLE

(71) Applicant: HYUNDAI MOBIS CO., LTD., Seoul (KR)

(72) Inventors: Sang Won Hwangbo, Yongin-si (KR); Choong Ryung Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/401,240

(22) Filed: Aug. 12, 2021

(65) Prior Publication Data

US 2022/0063550 A1     Mar. 3, 2022

(30) Foreign Application Priority Data

Aug. 25, 2020   (KR) ........................ 10-2020-0107339

(51) Int. Cl.
| | |
|---|---|
| *B60R 21/231* | (2011.01) |
| *B60R 21/2338* | (2011.01) |
| *B60R 21/207* | (2006.01) |
| *B60R 21/2342* | (2011.01) |
| *B60R 21/2165* | (2011.01) |
| *B60R 21/201* | (2011.01) |
| *B60R 21/217* | (2011.01) |

(52) U.S. Cl.
CPC ...... *B60R 21/23138* (2013.01); *B60R 21/201* (2013.01); *B60R 21/207* (2013.01); *B60R 21/2165* (2013.01); *B60R 21/2176* (2013.01); *B60R 21/2338* (2013.01); *B60R 21/2342* (2013.01); *B60R 2021/23107* (2013.01); *B60R 2021/23146* (2013.01); *B60R 2021/23386* (2013.01)

(58) Field of Classification Search
CPC .......... B60R 2021/23146; B60R 2021/23386; B60R 2021/2076; B60R 2021/23107; B60R 21/23138; B60R 21/231; B60R 21/2338; B60R 21/207; B60R 21/2342; B60R 21/2165; B60R 21/201; B60R 21/2176
USPC .......... 280/730.1, 730.2, 728.2, 743.1, 743.2
See application file for complete search history.

(56) References Cited

U.S. PATENT DOCUMENTS

| | | | | |
|---|---|---|---|---|
| 9,994,181 | B1* | 6/2018 | Dubaisi | ................ B60R 21/207 |
| 10,486,638 | B2* | 11/2019 | Kwon | ............... B60R 21/23138 |
| 10,759,374 | B2* | 9/2020 | Yoo | ..................... B60R 21/2338 |
| 10,906,495 | B2* | 2/2021 | Nagasawa | ............. B60R 21/207 |
| 10,974,686 | B2* | 4/2021 | Moon | .................... B60R 21/207 |
| 11,091,111 | B2* | 8/2021 | Deng | .................... B60R 21/013 |
| 11,230,250 | B2* | 1/2022 | Sturm | .................. B60R 21/207 |
| 2006/0119082 | A1* | 6/2006 | Peng | ................. B60R 21/23138 |
| | | | | 280/730.2 |

(Continued)

*Primary Examiner* — Keith J Frisby
(74) *Attorney, Agent, or Firm* — DLA Piper LLP (US)

(57) ABSTRACT

A side airbag for a vehicle includes: a main cushion located at a seat of the vehicle and configured to be unfolded at a front side of a passenger to a front of the vehicle when gas is injected into the main cushion; a sub cushion connected to a front-end portion of the main cushion and configured to be unfolded from the front-end portion of the main cushion toward the passenger when gas is injected into the sub cushion; a support tether having a first end connected to the seat and a second end connected to the sub cushion so as to support the sub cushion; and a cushion cover surrounding both the main cushion and the sub cushion, and having a tether slit through which the support tether passes.

10 Claims, 9 Drawing Sheets

(56) References Cited

U.S. PATENT DOCUMENTS

| | | | |
|---|---|---|---|
| 2006/0119083 A1* | 6/2006 | Peng | B60R 21/2338 280/730.2 |
| 2006/0131847 A1* | 6/2006 | Sato | B60R 21/23138 280/730.2 |
| 2017/0247006 A1 | 8/2017 | Rao | |
| 2018/0326938 A1* | 11/2018 | Rickenbach | B60R 21/2338 |
| 2019/0054890 A1* | 2/2019 | Kwon | B60R 21/2338 |
| 2019/0061675 A1* | 2/2019 | Kwon | B60R 21/23138 |
| 2019/0176739 A1* | 6/2019 | Song | B60R 21/207 |
| 2019/0283700 A1* | 9/2019 | Kwon | B60R 21/23138 |
| 2020/0324728 A1* | 10/2020 | Deng | B60R 22/12 |
| 2021/0170983 A1* | 6/2021 | Shin | B60R 21/23138 |
| 2021/0179009 A1* | 6/2021 | Lee | B60R 21/2338 |
| 2021/0402949 A1* | 12/2021 | Sung | B60R 21/207 |

\* cited by examiner

SIDE AIRBAG FOR VEHICLE

CROSS REFERENCE TO RELATED APPLICATION

The present application claims priority to Korean Patent Application No. 10-2020-0107339, filed Aug. 25, 2020, the entire contents of which is incorporated herein for all purposes by this reference.

BACKGROUND OF THE INVENTION

Field of the Invention

The present invention relates generally to a side airbag for a vehicle and, more particularly, to a side airbag protecting the side and front portions of a passenger.

Description of the Related Art

Recently, it is predicted that the interior space of a vehicle will be changed a lot due to the development of autonomous vehicles. With the development of autonomous driving, the part that is expected to change the most in the interior space of a vehicle is a seat of the vehicle In a traditional seat, only passive movements such as height adjustment or seatback angle adjustment were possible in a fixed posture facing the front of the vehicle. However, with the development of autonomous driving, a driver is freed from driving, whereby the seat can be actively moved to enable a rear-viewing posture or a side-viewing posture.

However, a conventional side airbag is designed to protect only the side of a passenger in preparation for a side collision with the seat facing forward, and cannot prepare for collision accidents in various directions when the seat is rotated, moved, or when the seat back is reclined. In a collision of the vehicle, the upper body of the passenger may move forward and the passenger and interior objects of the vehicle may collide with each other.

Accordingly, a technology that can provide an improved side airbag to effectively protect the passenger against a vehicle collision occurring in various directions is required.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to provide a side airbag for a vehicle, wherein a main cushion and a sub cushion are unfolded from a seat of the vehicle while surrounding a passenger, a support tether connecting the sub cushion to the seat is provided to restrain the passenger, a tether slit through which a support tether passes is provided on the cushion cover surrounding the main cushion and the sub cushion that are in the folded state, and the tether slit allows the main cushion and the sub cushion to be quickly unfolded when the main cushion and the sub cushion are unfolded while tearing the cushion cover.

A side airbag for a vehicle according to the present invention includes: a main cushion located at a seat of the vehicle and configured to be unfolded from side of a passenger toward front of the vehicle when gas is injected into the main cushion; a sub-cushion connected to a front-end portion of the main cushion and configured to be unfolded from the front end portion of the main cushion toward the passenger when gas is injected into the sub-cushion; a support tether having a first end connected to the seat and a second end connected to the sub-cushion so as to support the sub-cushion; and a cushion cover surrounding both the main cushion and the sub-cushion, and having a tether slit through which the support tether passes.

The cushion cover may include a tear line configured to allow the cushion cover to be torn when both the main cushion and the sub-cushion are unfolded, and the tear line may be extended through the tether slit.

The tear line may be extended in a vertical direction of the cushion cover, and be curved from the seat toward the tether slit to pass through the tether slit.

The cushion cover may be sealed by sewing-coupling at an upper side and a lower side thereof, and the tear line may be formed inside the cushion cover rather than a sewing-coupling portion.

The cushion cover may surround both the main cushion and the sub-cushion with a portion between a first end and a second end of the cushion cover, and include an over-lapped portion where the first end and the second end of the cushion cover overlap each other, and the tether slit may be provided at the overlapped portion.

The side airbag may include: a gas injector located at the seat of the vehicle and connected to the main cushion or the sub-cushion, and configured to inject the gas into the main cushion or the sub-cushion.

The side airbag may include: a coupling stud fixed to the gas injector and protruding outside the main cushion, wherein the cushion cover has a stud hole, at a location corresponding to the coupling stud, through which the coupling stud passes.

The main cushion and the sub-cushion may be respectively located at opposite sides of the seat and are unfolded symmetrically to each other.

The support tether may include: an upper tether having a first end connected to an upper portion of a seatback and a second end connected to an upper portion of the sub-cushion; and a lower tether having a first end connected to a lower portion of the seatback or a seat cushion and a second end connected to a lower portion of the sub-cushion.

The support tether may be a plane tether extended in a planar direction and is coupled to the sub-cushion while being in linear-contact with the sub-cushion.

According to the present invention, the side airbag for a vehicle is configured as follows.

The cushion cover surrounding the main cushion and the sub cushion has the tether slit through which the support tether passes, the tear line allowing the cushion cover to be torn when the main cushion and the sub cushion are unfolded is extended through the tether slit so as for the support tether to be located outside the cushion cover when the main cushion and the sub cushion are unfolded.

Accordingly, the main cushion and the sub cushion can be quickly unfolded.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

In the following description, the structural or functional description specified to an exemplary embodiment according to the concept of the present invention is intended to describe the exemplary embodiments, so it should be understood that the present invention may be variously embodied, without being limited to the exemplary embodiment.

An embodiment described herein may be changed in various ways and various shapes, so a specific embodiment is shown in the drawings and will be described in detail in this specification. However, it should be understood that the exemplary embodiment according to the concept of the present invention is not limited to the embodiment which will be described hereinbelow with reference to the accompanying drawings, but all of modifications, equivalents, and substitutions are included in the scope and spirit of the invention.

It will be understood that, although the terms first and/or second, etc. may be used herein to describe various elements, but these elements should not be limited by these terms. These terms are only used to distinguish one element, from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing a particular embodiment only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Hereinbelow, an exemplary embodiment will be described hereafter in detail with reference to the accompanying drawings. Like reference numerals given in the drawings indicate like components.

Figure 1:
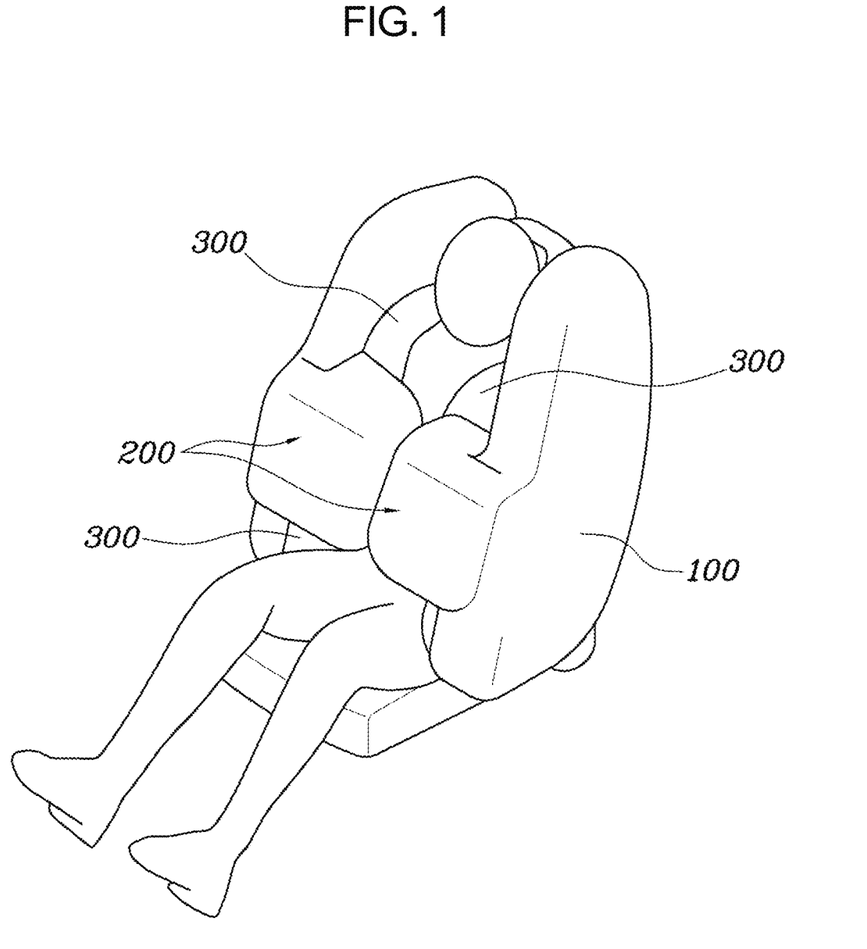
FIG. 1 is a perspective view showing a side airbag for a vehicle according to an embodiment of the present invention.
Figure 2:
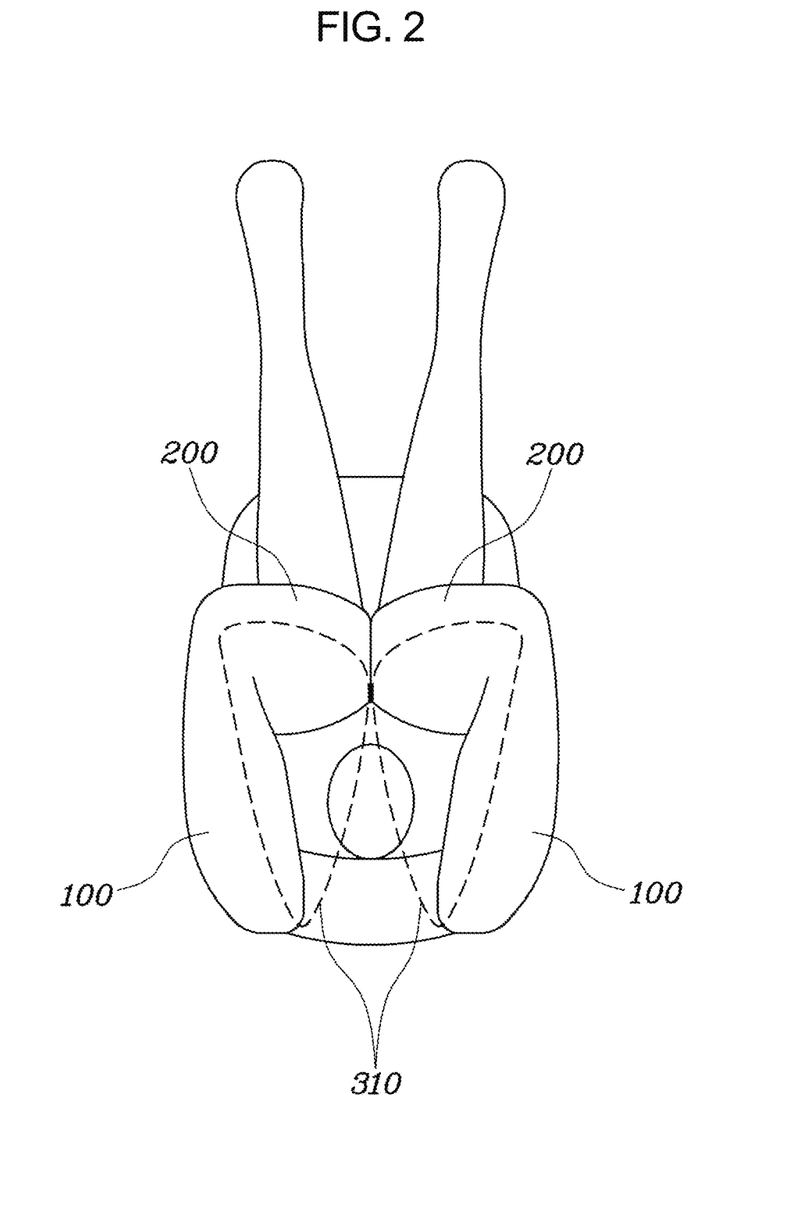
FIG. 2 is a plan view showing the side airbag for a vehicle according to the embodiment of the present invention.
Figure 3:
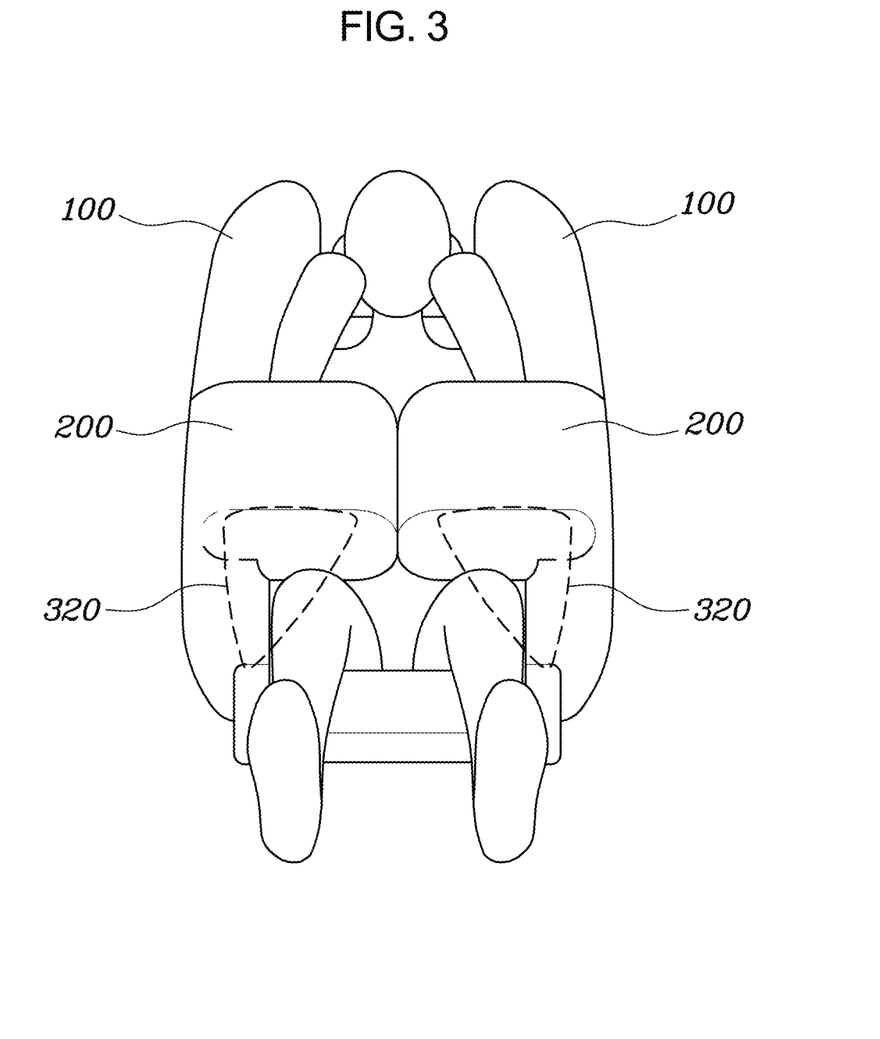
FIG. 3 is a front view showing the side airbag for a vehicle according to the embodiment of the present invention.
Figure 4:
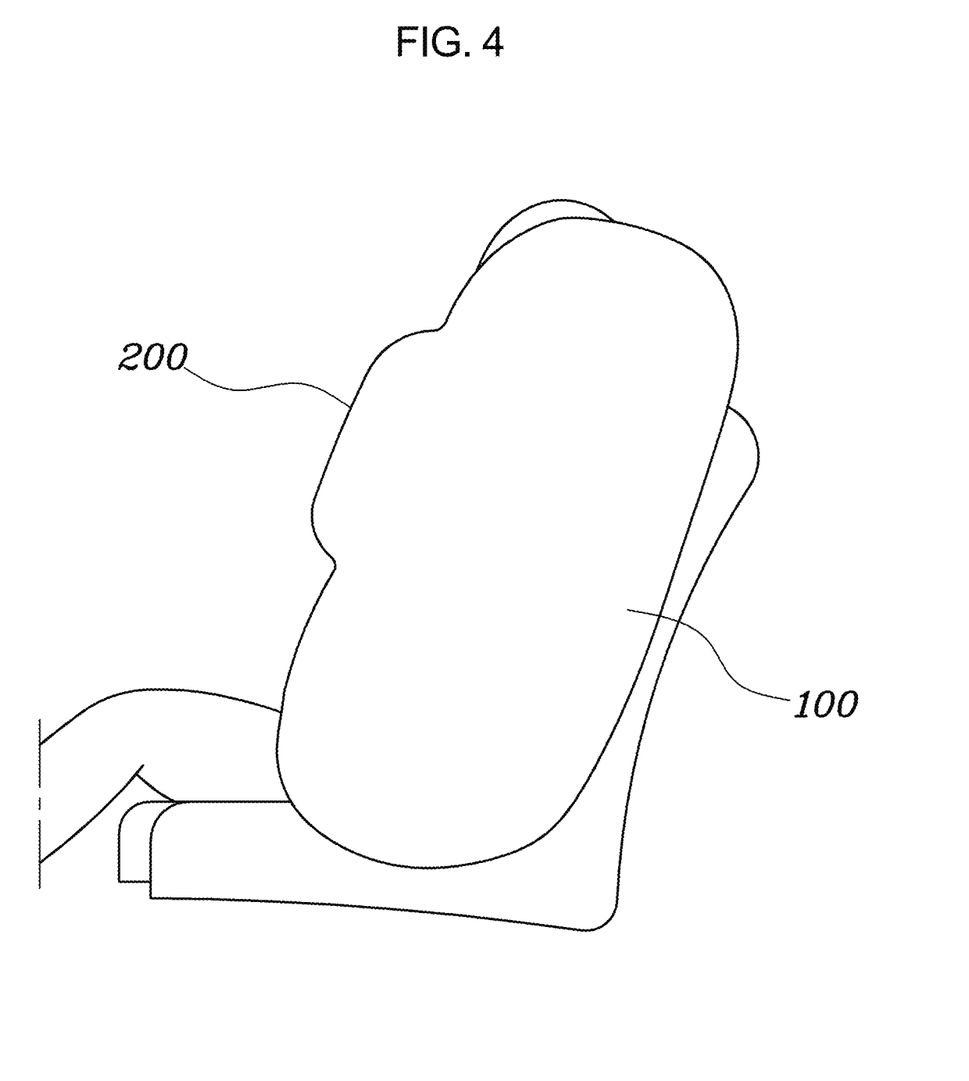
FIG. 4 is a side view showing the side airbag for a vehicle according to the embodiment of the present invention.
Figure 5:
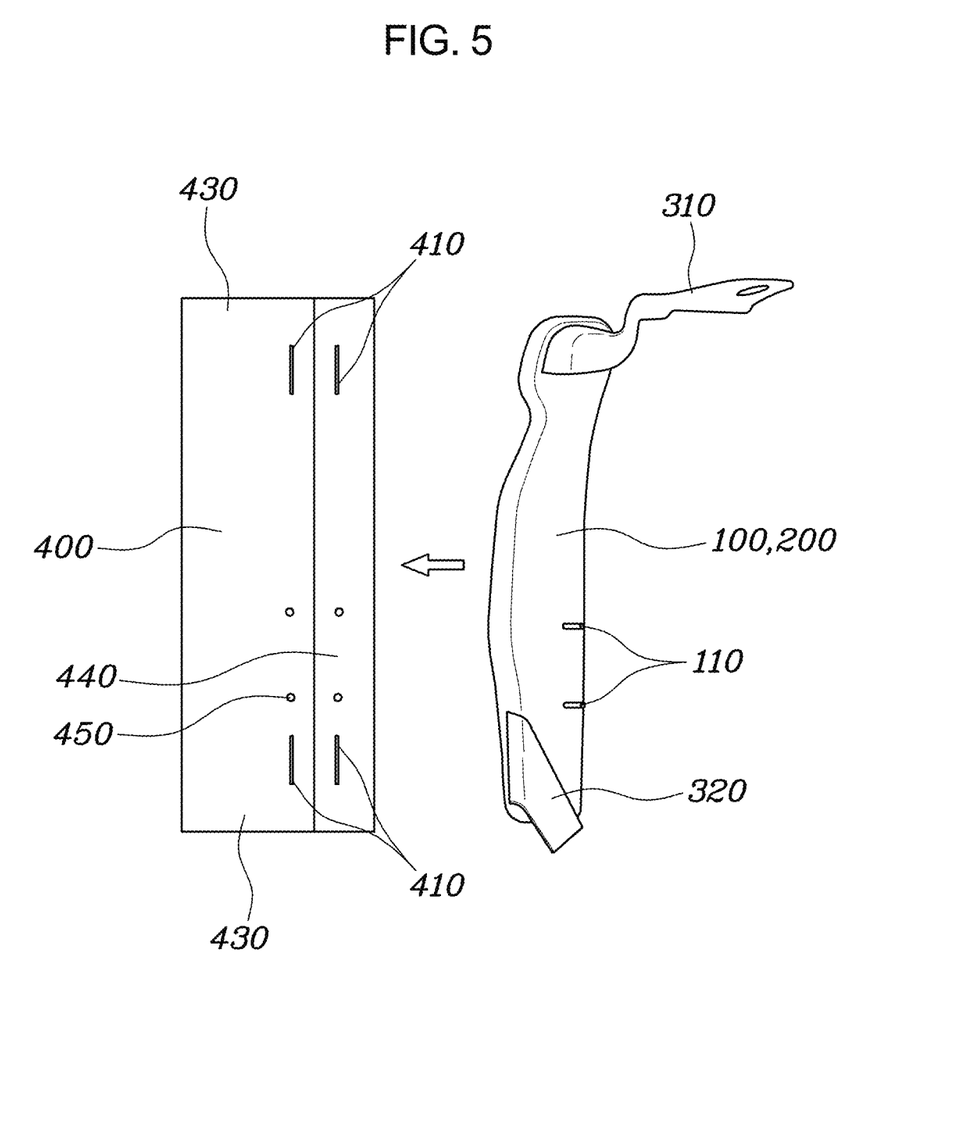
FIG. 5 is a view showing inserting a main cushion and a sub cushion into a cushion cover in the side airbag for a vehicle according to the embodiment of the present invention.
Figure 6:
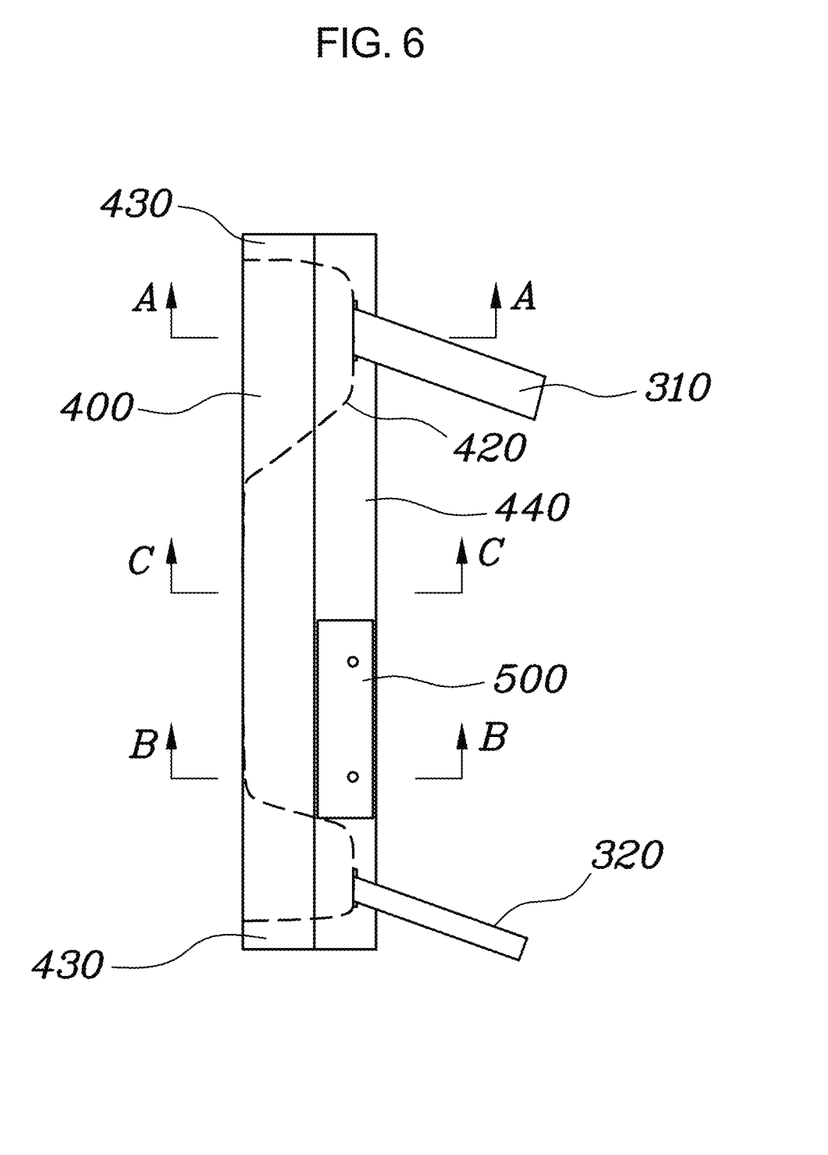
FIG. 6 is a view the main cushion and the sub cushion that have been inserted into the cushion cover in the side airbag for a vehicle according to the embodiment of the present invention.
Figure 7:
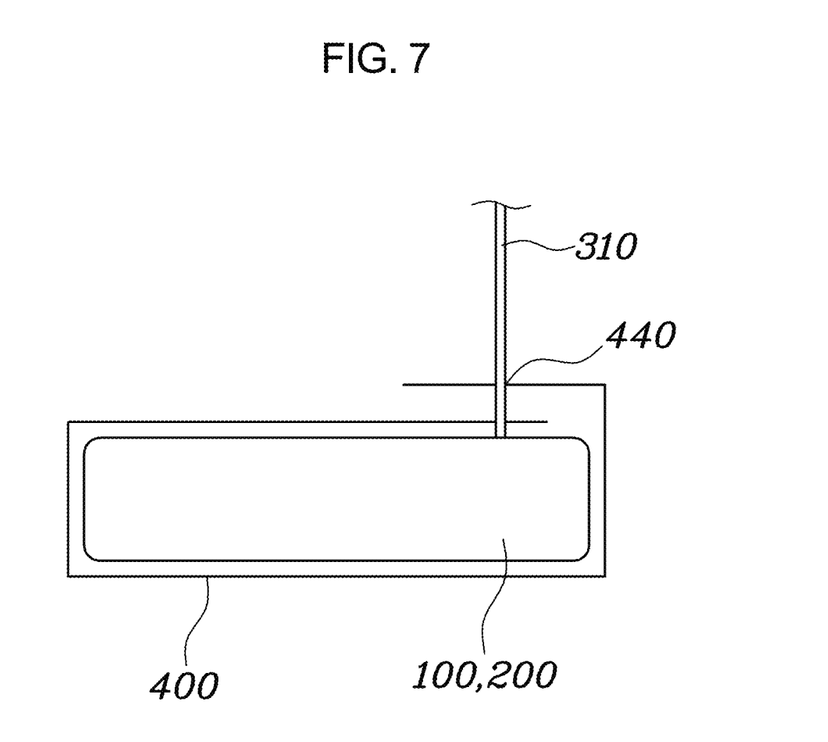
FIG. 7 is a sectional view taken along A-A in FIG. 6.
Figure 8:
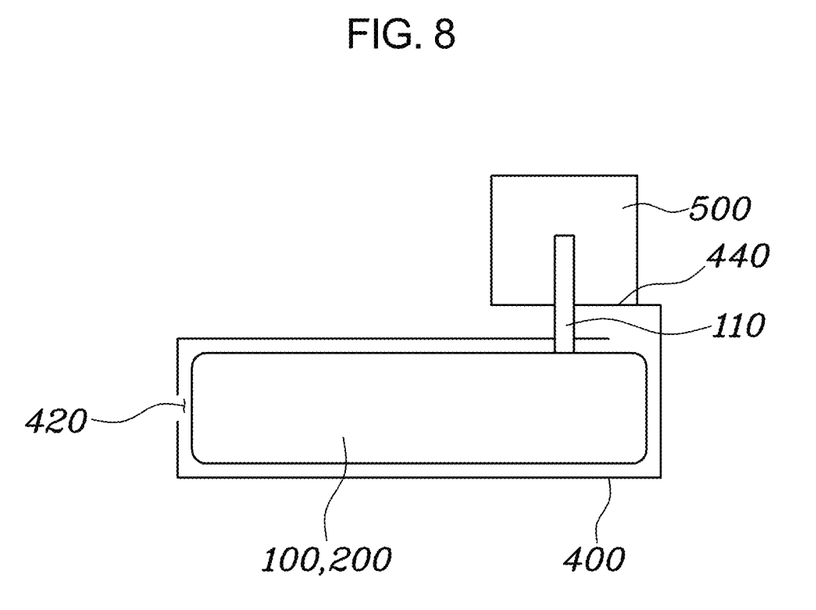
FIG. 8 is a sectional view taken along B-B in FIG. 6.
Figure 9:
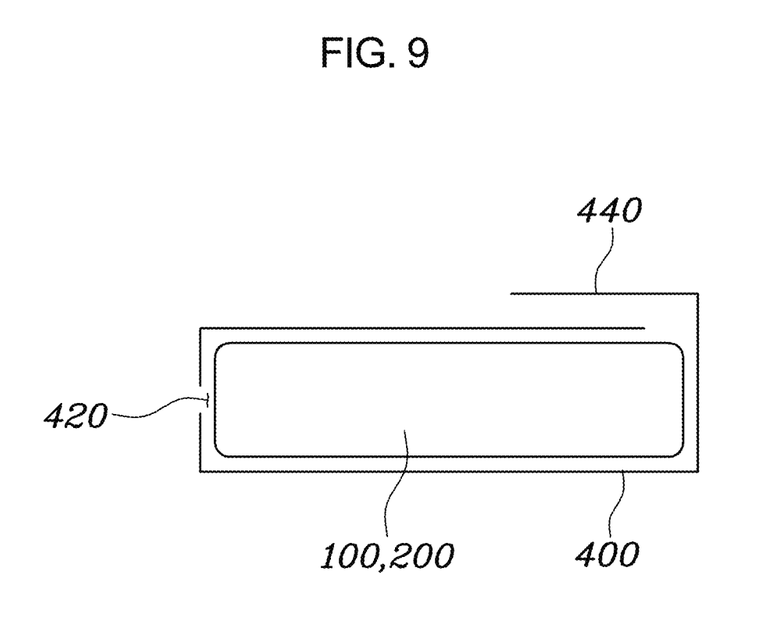
FIG. 9 is a sectional view taken along C-C in FIG. 6.

Hereinbelow, a side airbag for a vehicle according to an exemplary embodiment of the present invention will be described with reference to FIGS. 1 to 9.

According to the present invention, the side airbag is unfolded from a seatback of a vehicle to protect side and front portions of a passenger. A support tether 300 fixed to a seat of the vehicle restrains the passenger and protects the safety of the passenger during a crash of the vehicle.

The side airbag for a vehicle according to the present invention includes: a main cushion 100 located at a seat of the vehicle and unfolded from the side of a passenger to the front of the vehicle when gas is injected into the main cushion; a sub cushion 200 connected to a front-end portion of the main cushion 100 and unfolded from the front-end portion of the main cushion 100 toward the passenger when the gas is injected into the sub cushion; the support tether 300 having a first end connected to the seat and a second end connected to the sub cushion 200 so as to support the sub cushion 200; and a cushion cover 400 surrounding both the main cushion 100 and the sub cushion 200 and having a tether slit 410 through which the support tether 300 passes.

The main cushion 100 is unfolded from a side surface of the seat toward the front of the vehicle to protect the passenger. The sub cushion 200 is unfolded from the front-end portion of the main cushion 100 toward the passenger to be located in front of the passenger, thereby protecting the chest portion of the passenger.

The support tether 300 may have the first end fixed to the seat and the second end coupled to the seat.

Therefore, in a crash of a vehicle, the passenger who will escape forward or laterally from the seat due to an impact may be restrained by the support tether 300, and injuries to the passenger may be reduced.

The cushion cover 400 may be coupled to a seatback while surrounding both the main cushion 100 and the sub cushion 200 that are in a folded state before unfolded. A tether passes through the tether slit 410 formed on the cushion cover 400 so that the tether may be coupled to the seat.

Therefore, when the main cushion 100 and the sub cushion 200 are unfolded while cutting the cushion cover 400, the tether is located outside the cushion cover 400 to increase the unfolding speed of the main cushion 100 and the sub cushion 200.

The cushion cover 400 has a tear line 420 provided to tear the cushion cover 400 when the main cushion 100 and the sub cushion 200 are unfolded. The tear line 420 is extended through the tether slit 410.

The tear line 420 formed on the cushion cover 400 is torn when the main cushion 100 and the sub cushion 200 are unfolded. The tear line 420 is extended through the tether slit 410, so that the sub cushion 200 connected to the support tether 300 may be quickly unfolded when the main cushion 100 and the sub cushion 200 are unfolded.

Accordingly, the support tether 300 and the sub cushion 200 quickly restrains the passenger and the sub cushion 200 may quickly protect the front of the passenger.

The tear line 420 is extended in a vertical direction and is curved in a direction from the seat toward the tether slit 410 so as to pass through the tether slit 410.

The tear line 420 is started from the seat side and tears toward the tether slit 410 to pass through the tether slit 410, and is curved toward the seat side after passing through the tether slit 410, and may be extended in the vertical direction at the seat side.

The main cushion 100 is quickly unfolded from the seat side, and as the tear line 420 passes through the tether slit 410, both the sub cushion 200 and the support tether 300 may be quickly located in front of the passenger.

Accordingly, there is an effect of reducing injuries to the passenger, such that the main cushion 100 quickly protects the side portion of the passenger and the sub cushion 200 protects the front of the passenger and the support tether 300 restrains the passenger simultaneously.

The cushion cover 400 is sealed by sewing-coupling 430 at an upper side and a lower side of the cushion cover 400. The tear line 420 is formed inside the cushion cover 400 rather than the sewing-coupling 430.

The sewing-coupling 430 is performed at each of the upper side and the lower side of the cushion cover 400 to allow the upper side and the lower side of the cushion cover 400 to be sealed. The tear line 420 is formed inside the cushion cover 400 rather than the sewing-coupling 430 and may be extended in the vertical direction of the cushion cover 400.

When the gas is injected into the main cushion and the sub cushion 200, the main cushion 100 and the sub cushion 200 may be unfolded in all directions. The upper side and the lower side of the cushion cover 400 are sealed by the sewing-coupling 430 to cause an effect of guiding the main cushion 100 to be unfolded toward the front of the vehicle.

The cushion cover 400 surrounds both the main cushion 100 and the sub cushion 200 with a portion between a first end and a second end of the cushion cover 400. The cushion cover 400 includes an overlapped portion 440 in which the first end and the second end of the cushion cover overlap each other, and the tether slit 410 is formed on the overlapped portion 440.

The cushion cover 400 in which the upper side and the lower side thereof are sealed includes the overlapped portion 440 in which the first end and the second end of the cushion cover 400 overlap each other, whereby the cushion cover 400 may surround the main cushion 100 and the sub cushion 200 and pack the main cushion 100 and the sub cushion 200. The tether slit 410 is formed on the overlapped portion 440, so that the support tether 300 may pass through the tether slit 410.

Accordingly, the overlapped portion 440 may be fixed without separation by the support tether 300 passing through the tether slit 410.

The side airbag includes a gas injector 500 located at the seat of the vehicle, and connected to the main cushion 100 or the sub cushion 200 to inject gas into the main cushion 100 or the sub cushion 200.

The gas injector 500 may be located near the cushion cover 400 and inject the gas into the main cushion 100 and the sub cushion 200. The main cushion 100 and the sub cushion 200 communicate with each other, so the gas injector 500 injects the gas into the main cushion 100. The gas injected into the main cushion 100 is injected into the sub cushion 200, so that the main cushion 100 and the sub cushion 200 may be unfolded in order.

The side airbag includes a coupling stud 110 fixed to the gas injector 500 and protrudes outside the main cushion 100. The cushion cover 400 may have a stud hole 450, at a portion thereof corresponding to the coupling stud 110, through which the coupling stud 110 passes.

The coupling stud 110 protrudes outside the main cushion 100 and is coupled to the gas injector 500. The cushion cover 400 may have the stud hole 450 at the portion thereof corresponding to the coupling stud 110, and the coupling stud 110 may pass through the stud hole 450.

As the coupling stud 110 is coupled to the gas injector 500, the gas injector 500 may be located at a portion near the cushion cover 400.

The stud hole 450 may be formed in the overlapped portion 440, and the coupling stud 110 may fix the overlapped portion 440 while passing through the stud hole 450.

The main cushion 100 and the sub cushion 200 are located at each of opposite sides of the seat and may be unfolded symmetrically to each other.

The main cushion 100 and the sub cushion 200 are unfolded from the opposite sides of the seat and are located to be symmetric to each other to protect the opposite side portions of the passengers, so two sub cushions 200 may protect the front of the passenger.

Therefore, the passengers can be protected in all directions and be protected even in a lateral collision occurring at a side opposite to a seat where the passenger has seated in addition to a collision occurring at a door at the passenger side. Furthermore, even in any directional collision such as a forward collision or a rearward collision, the passenger can be protected.

The support tether 300 includes: an upper tether 310 having a first end connected to an upper portion of the seatback and a second end connected to an upper portion of the sub cushion 200; and a lower tether 320 having a first end connected to a lower portion of the seatback or a seat cushion and a second end connected to a lower portion of the sub cushion 200.

The upper tether 310 has the first end that is coupled to the upper portion or a side upper portion of the seatback and the second end that is coupled to the upper portion of the sub cushion 200. Therefore, the upper tether 310 may be unfolded while supporting the sub cushion 200 and surrounding the upper portion of the upper body of the passenger.

The lower tether 320 has the first end that is coupled to the lower portion of the seatback or the seat cushion, and the second end that is coupled to the lower portion of the sub cushion 200. Therefore, the lower tether 320 may be unfolded while surrounding the pelvis or the lower portion of the upper body of the passenger.

Accordingly, there may be an effect of preventing the passenger from escaping from the seat due to an impact when a vehicle collision occurs as the support tether tightly restrains the upper body of the passenger.

The support tether 300 is a plane tether extended in a planar direction and coupled to the sub cushion 200 while being in linear-contact with the sub cushion 200.

The support tether 300 is formed in the plane tether with a planar shape, and has a first end coupled to the seat and a second end coupled to the sub cushion 200 in a linear contact or planar contact.

Therefore, as the support tether 300 is formed in a plane tether and surrounds the passenger, the support tether 300 is coupled to the sub cushion 200, so that the binding force restraining the passenger may be improved and the probability of releasing the coupling between the support tether 300 and the sub cushion 200 may be reduced.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A side airbag for a vehicle, the side airbag comprising:
   a main cushion located at a seat of the vehicle and configured to be unfolded from a side of a passenger toward a front of the vehicle when gas is injected into the main cushion;
   a sub-cushion connected to a front-end portion of the main cushion and configured to be unfolded from the front-end portion of the main cushion toward the passenger when gas is injected into the sub-cushion;
   a support tether having a first end connected to the seat and a second end connected to the sub-cushion so as to support the sub-cushion; and
   a cushion cover surrounding both the main cushion and the sub-cushion, and having a tether slit through which the support tether passes.

2. The side airbag of claim 1, wherein the cushion cover includes a tear line configured to allow the cushion cover to be torn when both the main cushion and the sub-cushion are unfolded, and
   the tear line is extended through the tether slit.

3. The side airbag of claim 2, wherein the tear line is extended in a vertical direction of the cushion cover, and is curved from the seat toward the tether slit to pass through the tether slit.

4. The side airbag of claim 2, wherein the cushion cover is sealed by sewing-coupling at an upper side and a lower side thereof.

5. The side airbag of claim 1, wherein the cushion cover surrounds both the main cushion and the sub-cushion with a portion between a first end and a second end of the cushion cover, and includes an overlapped portion where the first end and the second end of the cushion cover overlap each other, and the tether slit is provided at the overlapped portion.

6. The side airbag of claim 1, further comprising:
   a gas injector located at the seat of the vehicle and connected to the main cushion or the sub-cushion, and configured to inject the gas into the main cushion or the sub-cushion.

7. The side airbag of claim 6, further comprising:
   a coupling stud fixed to the gas injector and protruding outside the main cushion,
   wherein the cushion cover has a stud hole, at a location corresponding to the coupling stud, through which the coupling stud passes.

8. The side airbag of claim 1, wherein the main cushion and sub-cushion are coupled such that a gas injected into the main cushion is also injected into the sub-cushion.

9. The side airbag of claim 1, wherein the support tether comprises:
   an upper tether having a first end connected to an upper portion of a seatback and a second end connected to an upper portion of the sub-cushion; and
   a lower tether having a first end connected to a lower portion of the seatback or a seat cushion and a second end connected to a lower portion of the sub-cushion.

10. The side airbag of claim 1, wherein the support tether is a plane tether extended in a planar direction and is coupled to the sub-cushion while being in linear-contact with the sub-cushion.

* * * * *